United States Patent

Beard et al.

[11] Patent Number: 5,867,156
[45] Date of Patent: *Feb. 2, 1999

[54] AUTOMATIC VIEWPORT DISPLAY SYNCHRONIZATION DURING APPLICATION SHARING

[75] Inventors: Albert L. Beard, Portland; William C. DeLeeuw, Hillsboro; David L. Anderson, Portland, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 555,482

[22] Filed: Nov. 8, 1995

[51] Int. Cl.⁶ .................................................. G06F 3/00
[52] U.S. Cl. ........................ 345/332; 345/330; 345/341; 345/348
[58] Field of Search .................................. 395/326–358, 395/200.04, 200.09, 200.34, 200.39, 200.35; 345/326–358

[56] References Cited

U.S. PATENT DOCUMENTS

| | | | |
|---|---|---|---|
| 4,974,173 | 11/1990 | Stefik et al. | 395/332 |
| 5,107,443 | 4/1992 | Smith et al. | 395/332 |
| 5,339,388 | 8/1994 | Bates et al. | 395/329 |
| 5,339,389 | 8/1994 | Bates et al. | 395/329 |
| 5,392,400 | 2/1995 | Berkowitz et al. | 395/200.04 |
| 5,442,788 | 8/1995 | Bier | 395/329 |
| 5,515,491 | 5/1996 | Bates et al. | 395/329 |
| 5,539,886 | 7/1996 | Aldred et al. | 395/200.04 |
| 5,583,993 | 12/1996 | Foster et al. | 395/200.35 X |

OTHER PUBLICATIONS

Simpson, "Mastering Wordperfect 5.1 & 5.2 for Windows", Sybex Inc., pp. 3–19, 22–23, 657–659, 1993.

*Primary Examiner*—John E. Breene
*Attorney, Agent, or Firm*—Duane, Morris & Heckscher LLP

[57] ABSTRACT

A method and apparatus for synchronizing the display of the output of one or more applications being shared on participating host and guest computers, where the respective areas available for display of the output are unequal. In one embodiment, the host or a guest may alter the output display on the monitor's of all other guest participants. The host issues a command receivable by participating guests to alter the displayed output on the guest monitors corresponding to display output surrounding a point movable within the output display on the host monitor. A guest wishing to alter the output display on other guest monitors issues a request receivable by the host which in turn issues a command to all guests to update their output displays. The guests can be instructed to update the displays on their monitors to display output surrounding a point, movable under control of the requesting guest, within the output displayed on the requesting guest's monitor. In another embodiment, the output displayed on a guest monitor is updated automatically, as a shared cursor is moved from the boundary of the output displayed on the guest monitor.

20 Claims, 10 Drawing Sheets

42 HOST VIEWPORT (b) ANALYZE EACH CLAIM CAREFULLY, CORRELATING EACH CLAIM ELEMENT TO THE RELEVANT PORTION OF THE WRITTEN DESCRIPTION THAT DESCRIBES THAT ELEMENT. GIVE CLAIM ELEMENTS THEIR BROADEST REASONABLE INTERPRETATION THAT IS CONSISTENT WITH THE WRITTEN DESCRIPTION. IF ELEMENTS OF A CLAIMED INVENTION ARE DEFINED IN MEANS PLUS FUNCTION FORMAT, REVIEW THE WRITTEN DESCRIPTION TO IDENTIFY THE SPECIFIC STRUCTURE, MATERIALS!

40 SHARED CURSOR

FIG. 6A

43 GUEST VIEWPORT (b) ANALYZE EACH C
CORRELATING EACH CLA
RELEVANT PORTION
DESCRIPTION THAT DESC
GIVE CLAIM ELEMENTS
REASONABLE INTERPR
CONSISTENT WITH THE W

FIG. 6B

43 GUEST VIEWPORT

THEIR BROADEST
TATION THAT IS
RITTEN DESCRIPTION.
ED INVENTION ARE
FUNCTION FORMAT,
DESCRIPTION TO
UCTURE, MATERIAL!

41 SHARED CURSOR

FIG. 6C

AUTOMATIC VIEWPORT DISPLAY SYNCHRONIZATION DURING APPLICATION SHARING

BACKGROUND OF THE INVENTION

1. Field of the Invention

This invention relates to the field of application program sharing between computers.

2. Description of the Related Art

Application sharing involves the simultaneous sharing of one or more application programs between two or more computer users. Typically, the applications reside on a "host" computer, and are shared with one or more remote computers, generally identified as "guests." The monitor of each computer involved in sharing the applications displays some portion of the applications' output. For example, when a word processing application is shared, the monitors display some part of the entered text. All participants are able to move a shared cursor, according to some formal turn-taking mechanism, and make data entries, via a mouse and keyboard, which are reflected on their own display monitor as well as on the monitors' of the other application sharing participants.

A problem arises in the application sharing field when some or all of the monitors involved have different video configurations or, relatedly, differently sized windows in which to view output of the one or more shared applications. Often, for example, one or more guest monitors has a smaller window display for the output of the one or more shared applications than does the host. The guest may choose to minimize the size of its shared application window to maximize the display area available for, for example, an unshared application running locally on the guest. In other instances, the host may simply have a larger display monitor than one or more of the guests. In any event, when the host's shared applications window exceeds in size the area of the one or more guest's shared applications window, the one or more guest is at risk of being unable to view the entire output of the shared applications.

The windows on the host and guest video monitors which display the output of the shared application or a set of shared applications are called the host and guest "viewports", respectively. The viewports essentially are bounding boxes which surround the display windows of the output of all of the applications currently being shared by the host and guest or guests.

In many cases, a host or guest may be entering, editing or pointing to, using its mouse cursor, a portion of the application output which is not visible on the monitor's of other guests, i.e., it is not within the viewport of those guests. This causes miscommunication, confusion and a work slowdown as guests try to determine what part of, for example, a document is being identified by mouse movements or affected by keyboard entries from another participant. Referring now to FIG. 1, a guest monitor 10 is shown. Typically, applications sharing programs provide a pan window 11 on the guest monitor. Pan window 11 typically is free to float about the entire display surface of guest monitor 10. The pan window displays a guest viewport representation 12 superimposed over a host viewport representation 13. The guest viewport representation 12 moves within the host viewport representation 13 to reflect the particular section of application output which is presently being displayed in the guest viewport 14 in relation to its position in the host viewport. A dot 15 reflects the position of the cursor currently being controlled by the host or a guest having "the turn." It also is known as the "shared cursor." If the dot is outside of the guest viewport representation 12, the shared cursor is in a portion of the shared application's output not currently within the display of guest viewport 14.

In conventional systems an affected guest is able to individually alter the display on his respective viewport to include, for example, a desired portion of the application output. The function is carried out by the guest using his mouse to "drag" and "drop" the guest viewport representation 12 within the pan window 11, for example, to encompass dot 15. This causes the output in guest viewport 14 to scroll to display the portion of application output appearing on the host's viewport as represented by the host viewport representation 13 which is encompassed by the bounds of guest viewport representation 12 in pan window 11, and which preferably includes that portion of the output including the shared cursor. This method requires individual guests to continue to constantly refer to pan window 11, for example, to find dot 15, which reflects the current shared cursor position. The shared cursor, however, is often being controlled by another participant and moves frequently. The need for a participant to constantly check pan window 11 for the location of dot 15 will divert the guest's attention from the matter at hand, namely operating on a shared application.

Another unsatisfactory solution to the problem includes limiting the respective window viewports of all participants to ensure compatibility. This unacceptably forces users to restrict their machine configurations when sharing applications.

Yet another unsatisfactory attempt at rectifying the problem is to arbitrarily scale the output from the shared application to fit a preselected guest viewport area. This can result in image-degrading video artifacts in the output on the guest and can cause difficulty in positioning a "shared" cursor in the reproduced output, since the scaling process might have eliminated coordinates from the output on the guest which the shared cursor must find.

SUMMARY OF THE INVENTION

The invention pertains to applications sharing between a host and at least one guest, the guest having a guest viewport on a guest video monitor, the host having a host viewport on a host video monitor, the applications generating an output display for the viewports of the at least one guest and the host. The invention tracks the position of a shared cursor on the guest video monitor and the output display of the viewport of the at least one guest is adjusted as necessary to maintain a desired portion of the output display within the viewport of the at least one guest.

In another embodiment, a host or guest may generate a point movable within its viewport. The point is movable by the host or guest to identify a section of the output display on the host or guest viewport which should be displayed in the guest viewports. A command is issued which causes the guest viewports to display the identified section of output display. In instances where there are plural guests, all guest viewports can be adjusted to concurrently display selected application output.

BRIEF DESCRIPTION OF THE DRAWINGS

The following detailed description will be more fully understood with reference to the accompanying drawings in which:

FIGS. 6A–6C are a graphic representation showing synchronization of an output of an application being shared;

DETAILED DESCRIPTION OF THE PREFERRED EMBODIMENTS

Figure 1:
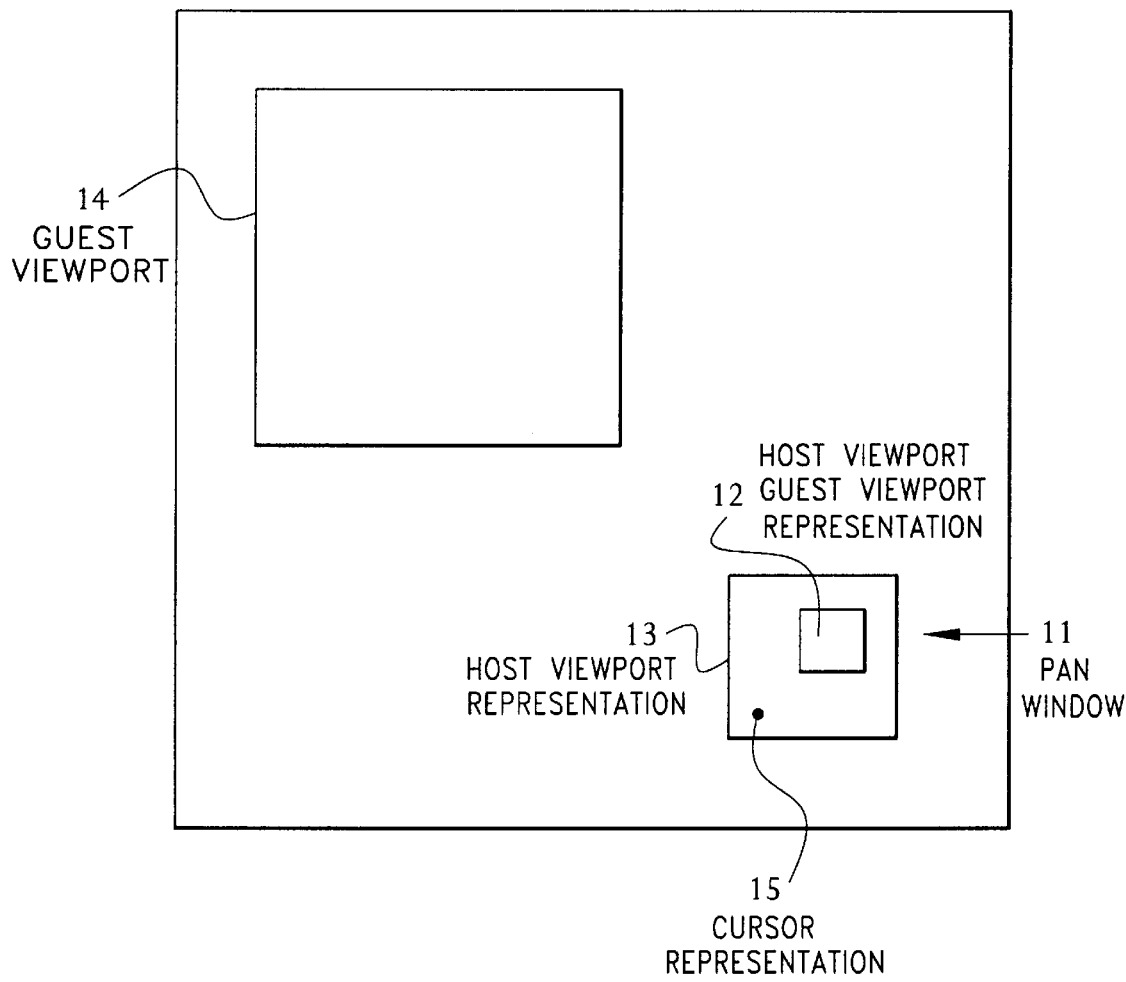
FIG. 1 is a representation of a guest monitor in a prior art applications sharing system.
Figure 2:
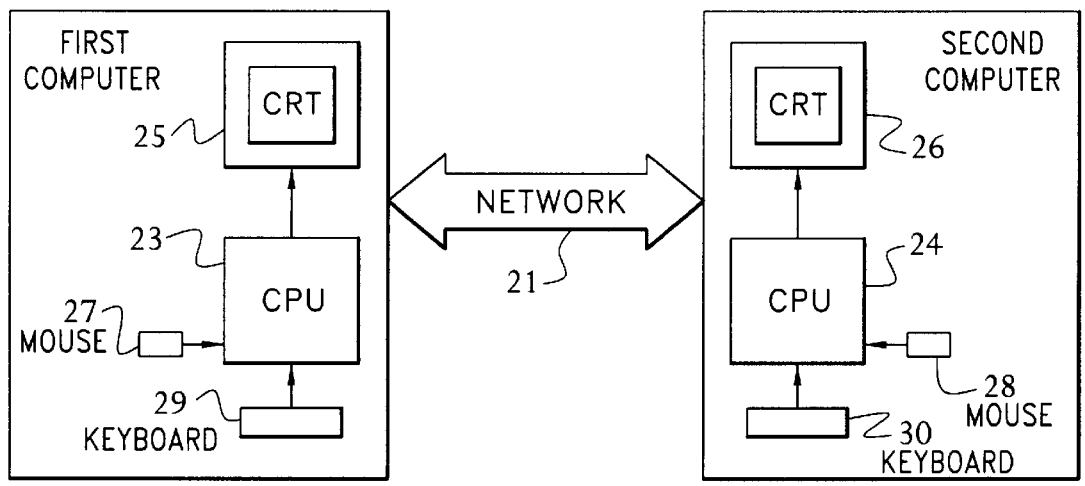
FIG. 2 is a block diagram of coupled applications sharing hardware, including a host computer and a guest computer.

It is known that two or more remote computer devices, such as remote personal computers can be coupled to share and process data. For example, referring to FIG. 2, a first computer 20 is bidirectionally coupled over network 21 to second computer 22. Network 21 can be a Local Area Network (LAN), Wide Area Network (WAN) and can be, for example, a connection made by a digital data line, telephone line, optical fiber, satellite or microwave transmission, coaxial cable or any other suitable communications link. First and second computers 20 and 22 include, for example, Central Processing Units (CPU's) 23, 24 coupled to CRT monitors 25, 26, respectively, for data display. Mouse devices 27, 28 and keyboards 29, 30 are coupled to CPU's 23, 24, respectively, for data input. Although FIG. 2 shows only two remote computer devices coupled by the bidirectional network 21, it is well known that many more than two computer devices may be coupled over a network in such a manner as to share processing and data and, as will be explained below, this invention can be used on such multi-unit networks.

Figure 3:
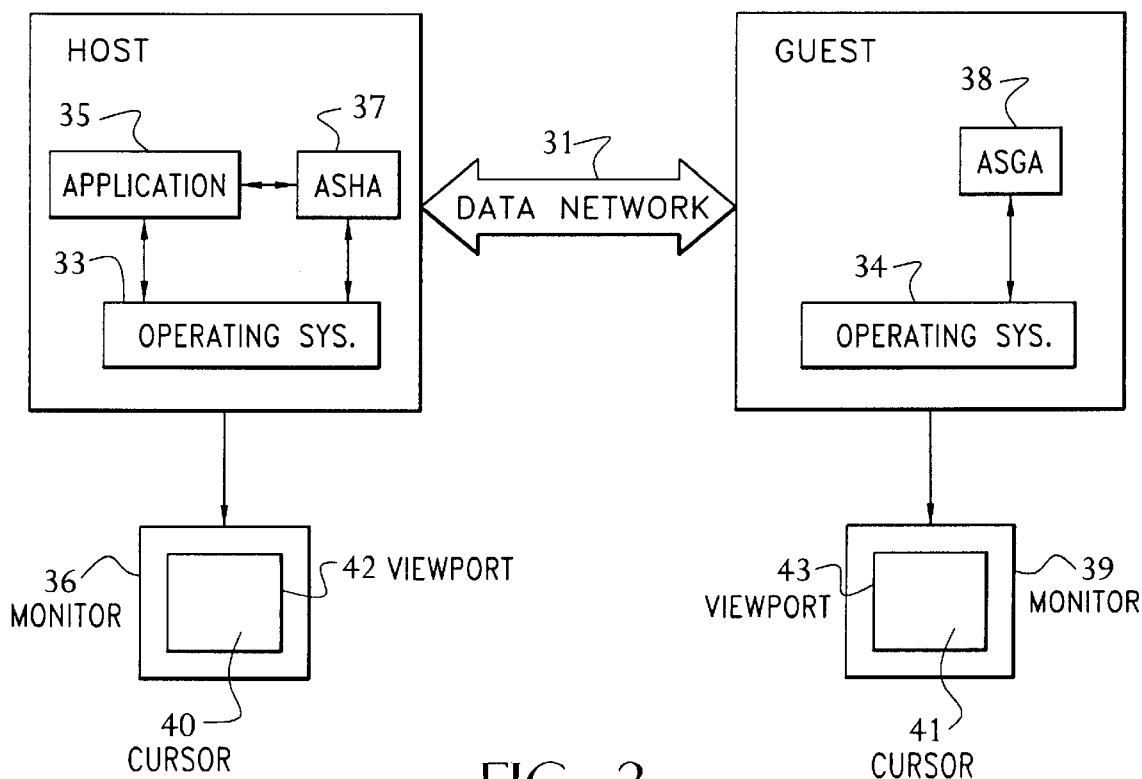
FIG. 3 is a block diagram of software of an applications sharing system.

Referring now to FIG. 3, an applications program sharing configuration between host computer 30 and guest computer 32 is shown. Host computer 30 and guest computer 32 are coupled via bidirectional data network 31. Each of host computer 30 and guest computer 32 include respective operating systems 33 and 34. Operating systems 33 and 34 manage the hardware resources of computers 30 and 32, respectively, and invoke and control other programs resident in memory accessible by computers 30 and 32.

In a configuration known to those skilled in the art, application program 35 may run on host computer 30, i.e. be loaded into RAM memory associated with host computer 30, but remain accessible for data input and output by and to, and further interaction with, guest computer 32 via bidirectional network 31. Application program 35 may be, for example, a word processing program enabling creation, editing, printing, etc. of text, which is displayed to participants on CRT monitors 36 and 39. Application program 35 also may be any other type of application program. Although only one shared application program 35 is shown on this embodiment, conventional application sharing configurations permit sharing of plural applications.

In a manner known to those skilled in the art, host computer 30 includes application sharing host application (ASHA) program 37. Similarly, guest computer 32 is provided with application sharing guest application (ASGA) 38. ASHA 37 and ASGA 38 enable host computer 30 and guest computer 32 to share application program 35, thereby enabling data entry from and essentially simultaneous output of data to each of host and guest computers 30 and 32. For example, where application being shared 35 is a word processing program, a user at host computer 30 and guest computer 32 may share and operate on a same document, such as by creating, editing, or deleting text. The output of the application being shared 35 appears essentially simultaneously on each of the monitors 36 and 39 associated with host and guest computers 30 and 32, respectively.

It should be recognized that more than one guest may share application 35, i.e., more than one guest can be coupled to the host 30 and to other guests, and share and process data with an application being shared 35 resident on host 30, in the manner described above. Typically, a formal turn-taking mechanism governs whether the host or the guest, and in configuration with multiple guests, which of the guests, has rights to control movement of a cursor which typically is displayed on the monitors of the other participants. For example, if guest 32 has "the turn", it controls movement of cursor 41 on monitor 39. Movement of cursor 41 by guest 32 also causes movement of, for example, host cursor 40 on host monitor 36. In cases where there are multiple guests, typically ASGAs, for example, of the multiple guests, generate shared cursors which mimic the movement of cursor 40 or 41 being controlled by host 30 or a guest 32, respectively, which has the turn. Preferably, the guests not having the turn maintain control of their local cursors, for example, for use with a locally-running, non-shared application. In a preferred embodiment, when a guest obtains "the turn", the shared cursor merges with the local cursor and the guest can control its local cursor within the shared application. Typically, therefore, movement of a shared cursor by a guest having the turn is tracked and mimicked by, for example, host cursor 40 and the ASGA-generated shared cursors on the monitors of any other participating guests not having "the-turn."

Occasionally, the video systems or monitors associated with the host and guest do not match. For example, frequently the host may have a much larger viewing surface available for viewing the application output than does the guest. The host simply may have a larger monitor than does the guest or the guest may have chosen to restrict the viewing area dedicated to the output of the one or more shared applications. For example, host monitor 36 has a larger viewing area, host viewport 42, than does guest monitor 39, in guest viewport 43. In such circumstances, the guest may be unable to view the entire output of shared application 35 and any other applications being shared. This is problematic, especially when the host or another guest is providing input or referring to a portion of the output of shared application 35 which is not within guest viewport 43. In a past solution to the problem, an affected guest could individually, manually adjust the display of his viewport using the technique described above in the Related Art section.

In one embodiment of the invention, the host, or any of the guests, through the host, can issue a command which synchronizes the display of all of the guests so that all of the guests substantially simultaneously view a similar portion of the output of the application being shared 35.

Figure 4A:
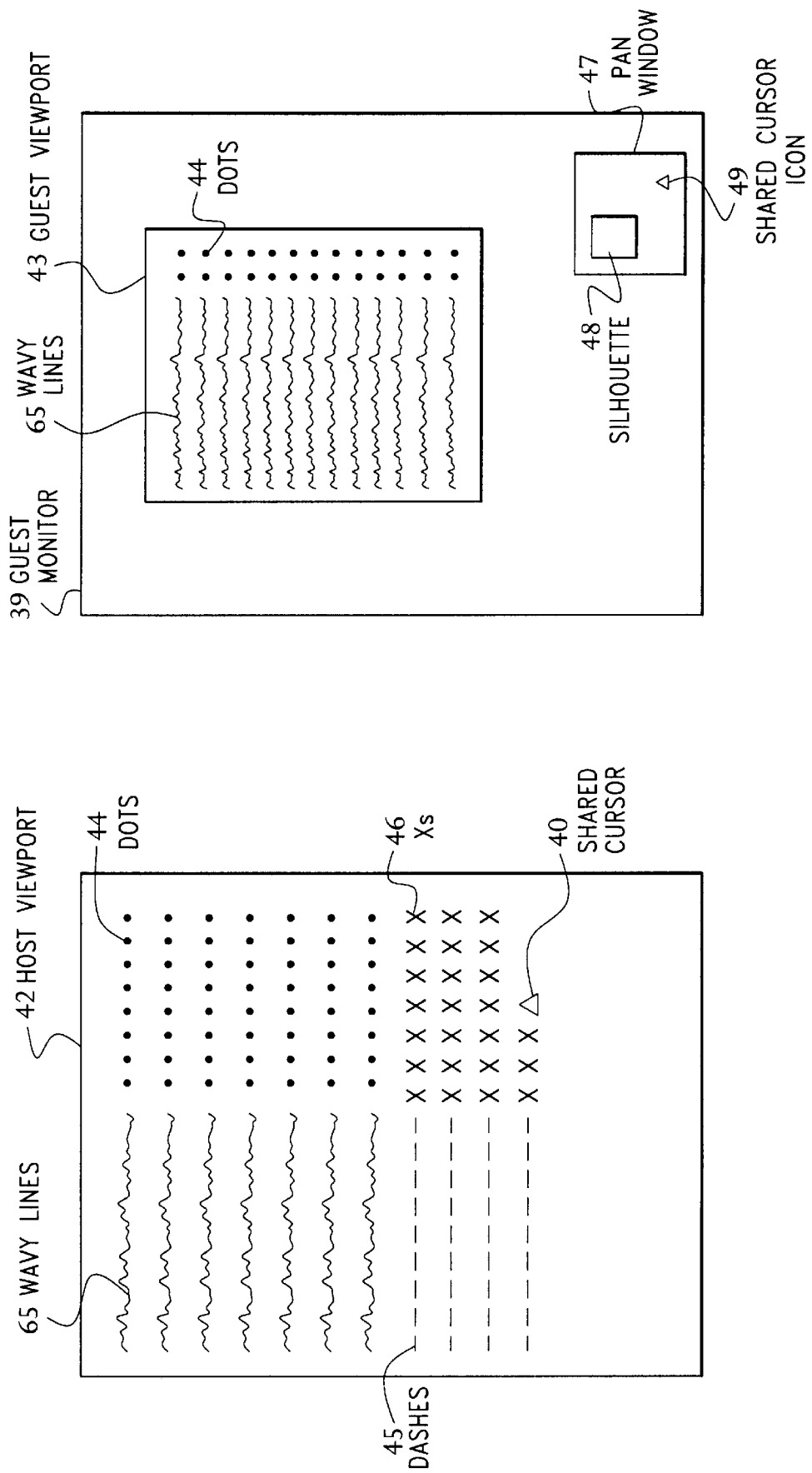
FIG. 4A is a block diagram of the simultaneous display of the output of an application being shared on a host and guest monitor.

Referring to FIG. 4A, host viewport 42 displays an output of application being shared 35, for purposes of representation being identified by wavy lines 65, dots 44, dashes 45 and x's 46. Shared cursor 40 is located at the lower right corner of host viewport 42.

Guest viewport 43 on guest monitor 39 displays, for example, wavy line output 65 and a portion of dot output 44, wherein it can be seen that guest viewport 43 is displaying output from application being shared 35 which appears toward the upper left portion of host viewport 42. Because of the discrepancy in the viewing area available to the host and guest, the output on guest viewport 43 is some portion of the entire output visible on host viewport 42. Shared cursor 40 is positioned in the lower right corner of host viewport 42. In its position shown in FIG. 4A, shared cursor 40 is outside of and not shown in guest viewport 43. The user viewing guest viewport 43 is unable to view the shared cursor 41 and surrounding displayed output of application being shared 35, which are, for example, visible to the host and any guests which happen to be individually synced to the host.

In an embodiment of the invention, pan window 47 appears on guest monitor 39. Pan window 47 is a representation of the full size of host viewport 42, which, as noted above, is a boundary on host monitor 36 which encompasses the windows of the output of shared application 35. Host viewport 42 can be the entire display surface of host monitor 36 or some portion thereof. Pan window 47 includes silhouette 48, which is a representation of guest viewport 43 and by its location within pan window 47 reflects that portion of the output of application being shared 35, in relation to its position in host viewport 42, presently visible in guest viewport 43. Silhouette 48 moves about pan window 47 as necessary to provide an accurate reflection of the output visible in guest viewport 43 relative to the position of that output in host viewport 42. For example, in the situation represented in FIG. 4A, the silhouette is towards the upper left corner of pan window 47, which represents that the data being displayed in guest viewport 43 is the output appearing in the upper left corner of host viewport 42.

Also shown in pan window 47 is icon 49 which shows the position of the shared cursor relative to its position in host viewport 42. The position of icon 49 in pan window 47 correctly shows that shared cursor 40 is positioned in the lower right corner in host viewport 42 in an area not currently displayed in guest viewport 43.

Figure 5:
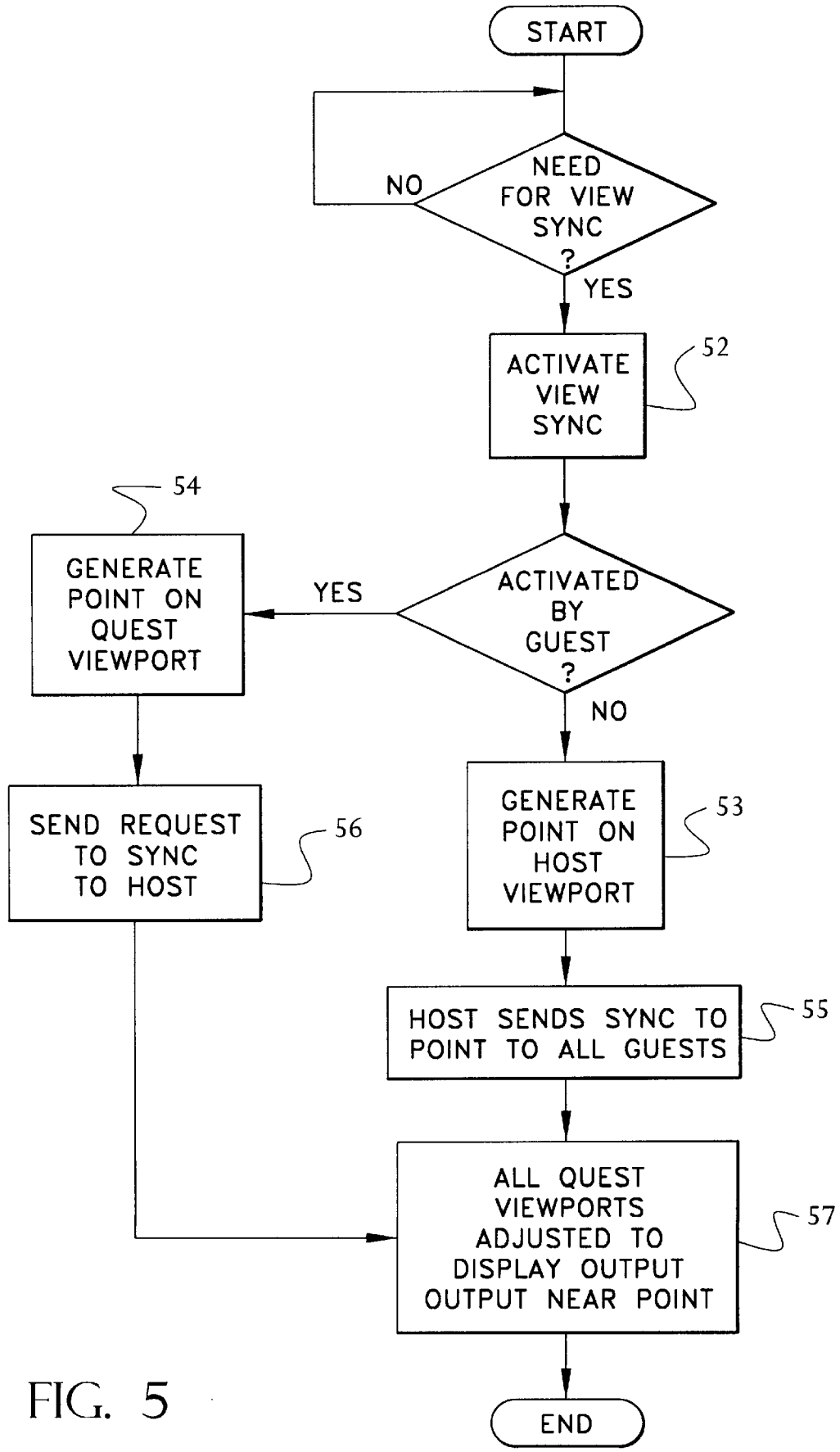
FIG. 5 is a flow chart showing synchronization of one or more guest output displays according to an embodiment of the invention.

According to a preferred embodiment, the display of one or more guest viewports 43 are adjustable to display desired sections of the displayed output of application being shared 35, for example as necessary to capture shared cursor 41 and surrounding output display. For example, referring also to FIG. 5, the host or the guest may determine that the display of output in all guest viewports should be synchronized, to for example display a particular portion of the output of application being shared 35.

Figure 4B:
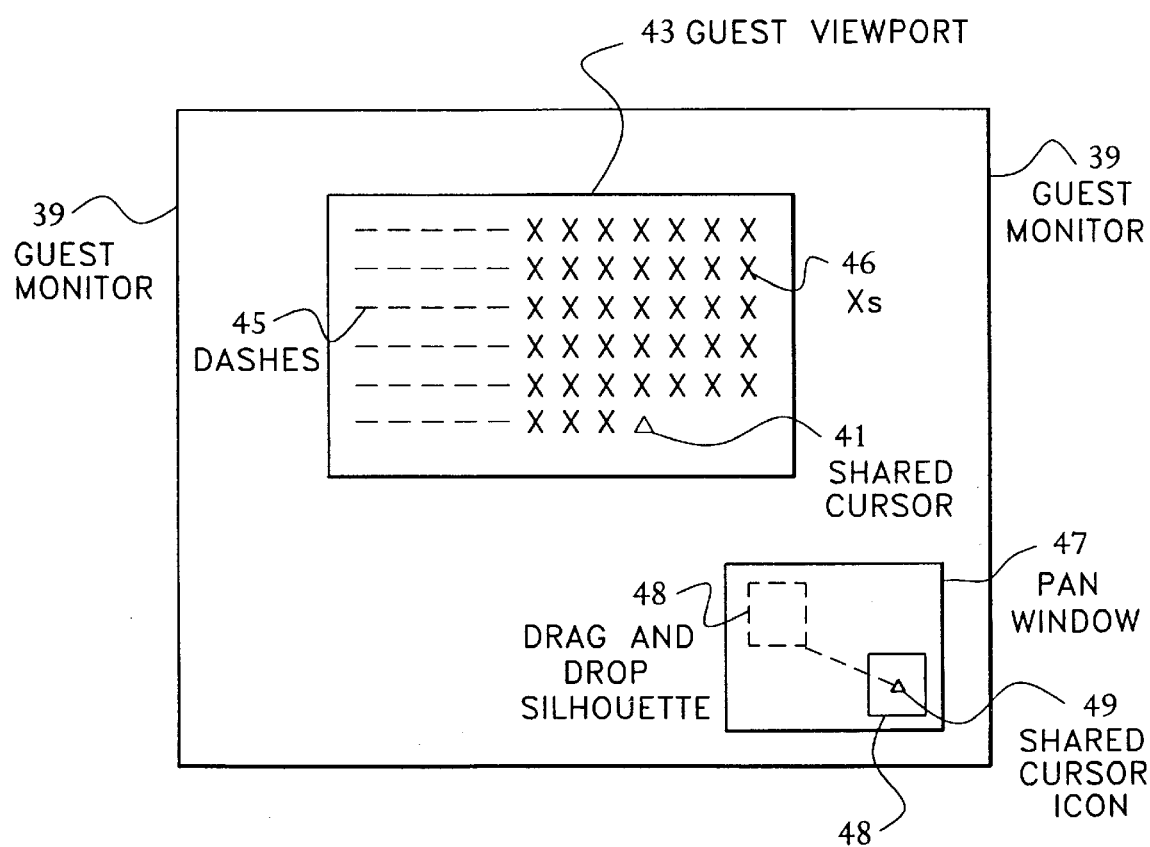
FIG. 4B is a block diagram of movement of silhouette 48 to adjust the display of a guest prior to issuance of a REQUEST TO SYNC command.

If a guest desires to adjust the display in one or more other guest viewports, it must first capture in its own viewport, if it is not already being displayed, the portion of the shared application output it wishes to be displayed in other guest viewports. This can be done by manually dragging and dropping silhouette 48 to encompass icon 49 in pan window 47 as shown in FIG. 4B (or generally to encompass the desired portion of output display on host viewport 42 as represented by pan window 47). As also shown in FIG. 4B, this will bring the desired text sections 45 and 46 into display on guest viewport 43. At this point, the guest may activate a VIEW SYNC request module 52 in, for example, ASHA 37. The module may be called, for example by "clicking" on a VIEW SYNC icon provided by ASHA 37 or depressing a designated keyboard key.

Figure 4C:
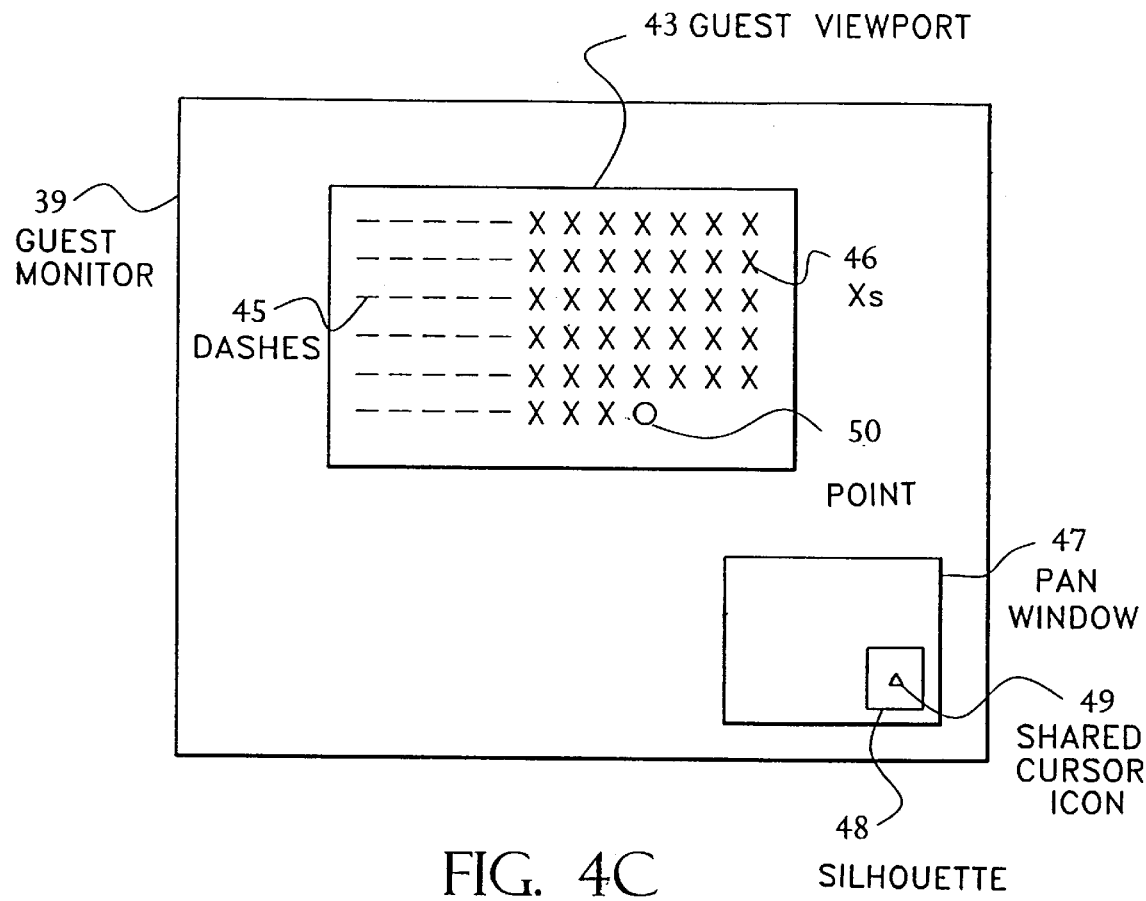
FIG. 4C is a block diagram of the generation of a point to which other guest viewports will be synced.

Referring now to FIG. 4C, after activation of VIEW SYNC module 52, ASHA 37 generates 54 a distinctive cursor shape or point 50, on the monitor of the guest 32 that requested the VIEW SYNC. In a like manner, host 30 can activate 52 a VIEW SYNC request module by clicking on a VIEW SYNC icon provided by ASGA 38 or depressing a designated keyboard key. ASGA 38 preferably generates a distinctive cursor shape or point 50 which is movable about the host viewport 42. For example, if a host requested the VIEW SYNC, ASHA 37 generates 53 point 50 in host viewport 42 (not shown). If a guest requested the VIEW SYNC, ASGA 38 generates 54, point 50 in guest viewport 43, as shown in FIG. 4C.

Point 50 is controllable by the requester, for example by using a mouse or other input device, and can be moved about the requester's monitor, such as about host viewport 42 or guest viewport 43, by the respective host or guest requester. For example, a host requester can move point 50 to a position on host viewport 42 which includes shared cursor 40 or other important displayed information from the output of shared application 35 so that all of the guests may be "synced" to that location, i.e., the guest viewports will be made to display an area of output corresponding to the area surrounding point 50. To accomplish this step, a host user can, for example, click on a mouse button or press a designated keyboard key after moving the point to the desired location, whereby the ASHA 37 will send a SYNC TO POINT message 55 to ASGA 38 of all guests to adjust the display in all guest viewports. ASGA 38 of each guest converts the SYNC TO POINT command to local screen coordinates and adjusts 57 the displayed output in its associated viewport to capture the output which is near point 50 in its position on host viewport 42.

A guest user can move point 50 within guest viewport 43 to a desired location, as shown in FIG. 4C. For example to sync other guests to the output of application being shared 35 which includes, for example, shared cursor 41, a guest would move point 50 over or adjacent shared cursor 41 and, for example, click a mouse button or other actuator whereby ASGA 38 sends a REQUEST TO SYNC message 56 to ASHA 37 of host 30. ASHA 37 preferably issues a SYNC TO POINT command 55 to ASGA 38 of all participating guests, whereupon the displayed output in viewports 43 of the other guests is changed 57 according to the position of point 50 in viewport 43 of the requesting guest. The SYNC TO POINT command is converted by each guest to its respective local screen coordinates.

Figure 4D:
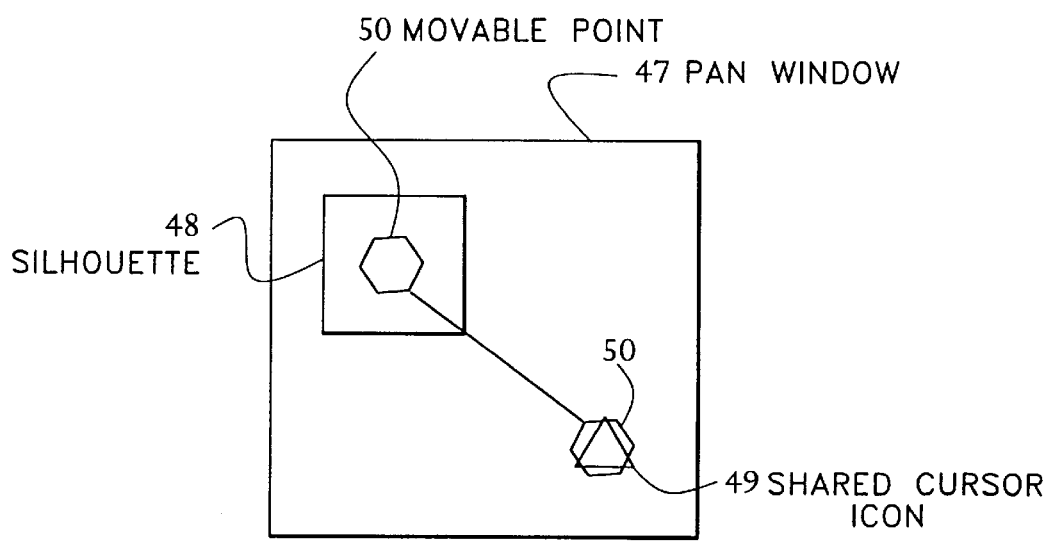
FIG. 4D is a block diagram of a pan window showing a point and movement of the point to synchronize a guest display with a host display.

In an alternate embodiment, the point 50 is generated within pan window 47, eliminating the need for the requesting guest to first drag and drop silhouette 48 to encompass icon 49 or to properly position it within pan window 47 to first capture the desired output. Referring to FIG. 4D, for example, to capture the section of the output of application being shared 35 which includes shared cursor 41, a guest would need to move the point to the lower right corner of the pan window, near the position of icon 49. After moving the point to its desired location, the guest can, for example, click a mouse button or other actuator whereby ASGA 38 sends a REQUEST TO SYNC message 56 to ASHA 37 of host 30. ASHA 37 preferably issues a SYNC TO POINT command 55 to ASGA 38 of guest 32 and any other participating guests, whereupon the displayed output in viewport 43 of guest 32 and all other participating guests is changed 57 according to the position of point 50 in pan window 47. As noted, pan window 47 represents host viewport 42 and icon 49 represents the shared cursor. Therefore the guest monitors are changed to include application being shared output 35 which is near point 50 in host viewport 42 as represented by pan window 47. The SYNC TO POINT command is converted by each guest to its respective local screen coordinates.

Guest viewports therefore, can be adjusted to display the same information irrespective of whether host 30, guest 32 or any other participating guest moved point 50 to the desired position, either on the host viewport, the requesting guest viewport, and in an alternate embodiment, on the requesting guest's pan window, and issued a REQUEST TO SYNC or SYNC TO POINT command. The display on the host viewport is unaffected by the "syncing" of guest viewports.

Referring now to FIGS. 6A–C, a host viewport 42 displays an output of an application being shared, such as the output of a word processing program. Host viewport 42 displays complete lines of text, except for the last line, which ends with the word "materials." Shared cursor 40 is visible after the word "materials".

FIG. 6B is a representation of guest viewport 43 "out of sync" with host viewport 42, similar to the situation reflected in FIG. 4A. Guest viewport 43 shows the beginning of the top 7 lines of text, but does not show the section where text is being or can be entered. However, after execution of a SYNC TO POINT command 55 issued by the host, possibly invoked by a REQUEST TO SYNC command 56 from a guest, guest viewport 43 displays the text in the lower right portion of host viewport 42, including the shared cursor 41, as discussed above in reference to FIGS, 4B, 4C and 4D.

In an embodiment, upon execution of the SYNC TO POINT command, the guest viewport centers around the point and output of application being shared 35 surrounding the point, thereby displaying an equal amount of application output above and below and on either side of the point. In another preferred embodiment, the guest viewport, upon execution of the SYNC TO POINT, is modified such that the point is positioned at the lower right of the screen, whereby much of the preceding text or application output is visible. This embodiment is illustrated in FIG. 6C.

In another embodiment of the invention, guest viewport 43 automatically adjusts itself to keep a guest shared cursor within the bounds of guest viewport 43. For example, referring now to FIGS. 7A and 7B, a host may move host shared cursor 71 around host viewport 42. Guest shared cursor 72 in the guest essentially will track movement of host shared cursor 71. Relatedly, any guest may move its guest shared cursor, which movement is tracked by host shared cursor 71 and the shared cursor of any other guests. In this embodiment of the invention, ASGA 38 automatically senses when guest shared cursor 72 is driven from the bounds of guest viewport 43. ASGA 38 adjusts the output display of guest viewport 43 to, for example, capture the output display of application being shared 35 into which the host shared cursor 71 has been driven, as well as to maintain a display of guest shared cursor 72.

Figure 7A:
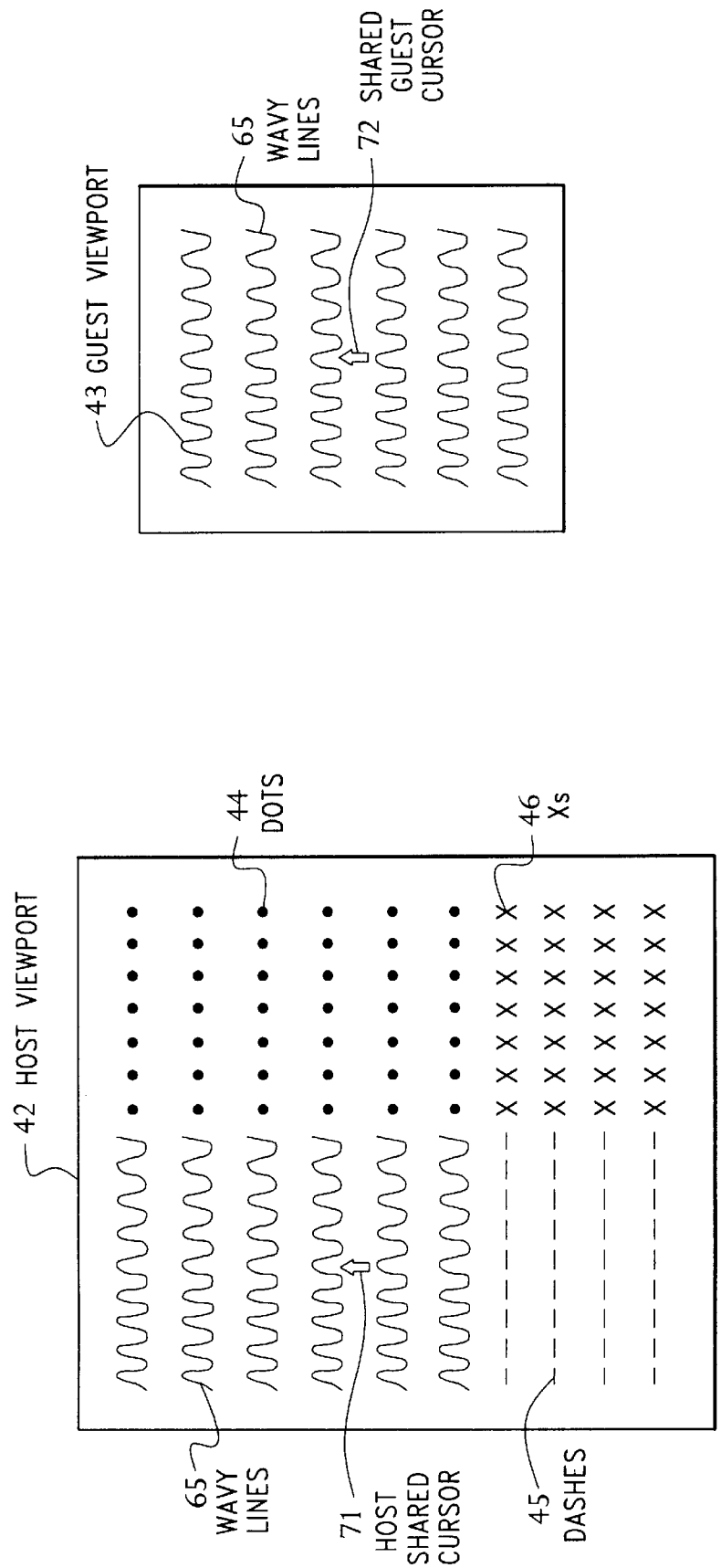
FIGS. 7A and 7B are block diagrams showing view synchronization of a guest output display according to another embodiment of the invention.

As shown in FIG. 7A, shared cursor 71 in host viewport 42, is positioned in output text 65. The fall output of, for example, shared application 35, namely dots 44, dashes 45 and x's 46 also is shown displayed on host viewport 42. Smaller guest viewport 43 is capable of displaying only a portion of the entire output display of shared application 35 being displayed on host viewport 42. For example, wavy line output 65 is shown displayed on guest viewport 43 in FIG. 7A, along with guest shared cursor 72, corresponding to its shared position with host shared cursor 71.

Figure 7B:
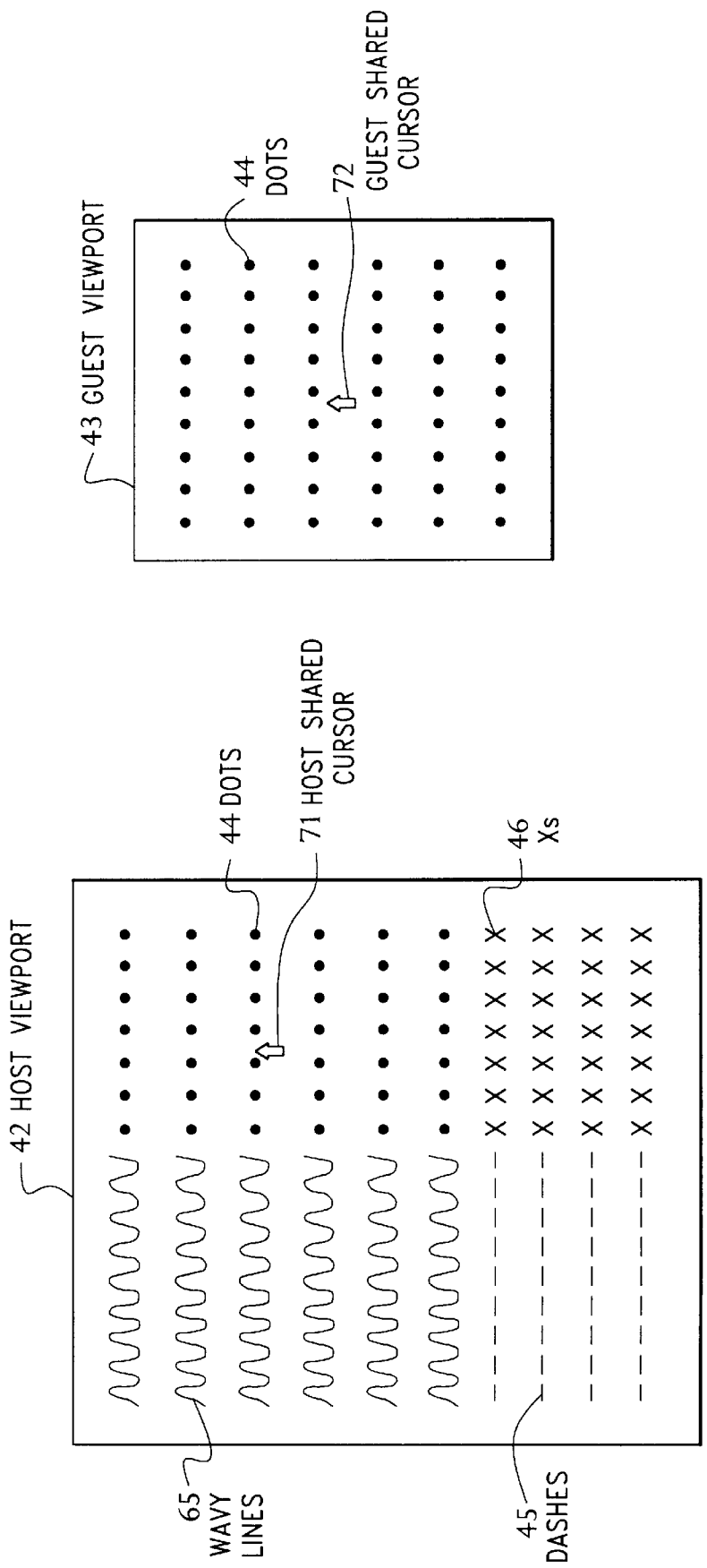

Referring to FIG. 7B, in a preferred embodiment of the invention, if host shared cursor 71 is moved by a host or a guest having the turn to another portion of the output of shared application 35, such as, for example, to dots 71, the output display on guest viewport 43 will scroll to include this section of output. Guest shared cursor 72 also will continue to be displayed in guest viewport 43.

In the preferred embodiment, a guest shared cursor 72 may be controlled by the host or any guest having the turn, including the guest itself. Movement of guest shared cursor 72 is mimicked by host shared cursor 71 on host viewport 42. Guest viewport 43 will scroll to change the displayed output in guest viewport 43 whenever guest shared cursor 72 is driven, for example, to, against or outside of a boundary of guest viewport 43. For example, referring to FIG. 7A, if guest shared cursor 72 is forced to or against the bottom of guest viewport 43, guest viewport 43 would scroll to begin displaying the top sections of the output immediately beneath wavy lines 65, namely dashes 45. Relatedly, host shared cursor 71 would track guest shared cursor 72 and would become positioned in the dashes 45 in host viewport 42. In another example, if guest shared cursor 71 is moved diagonally to the lower right corner of guest viewport 43, guest viewport 43 would scroll to display, for example, the end of the last few lines of wavy lines 65, the beginning of the last few lines of dots 44, the end of the first few lines of dashes 45 and the beginning of the first few lines of x's 46. Host shared cursor 71 will track in host viewport 42 the movement of guest shared cursor 72.

Figure 8:
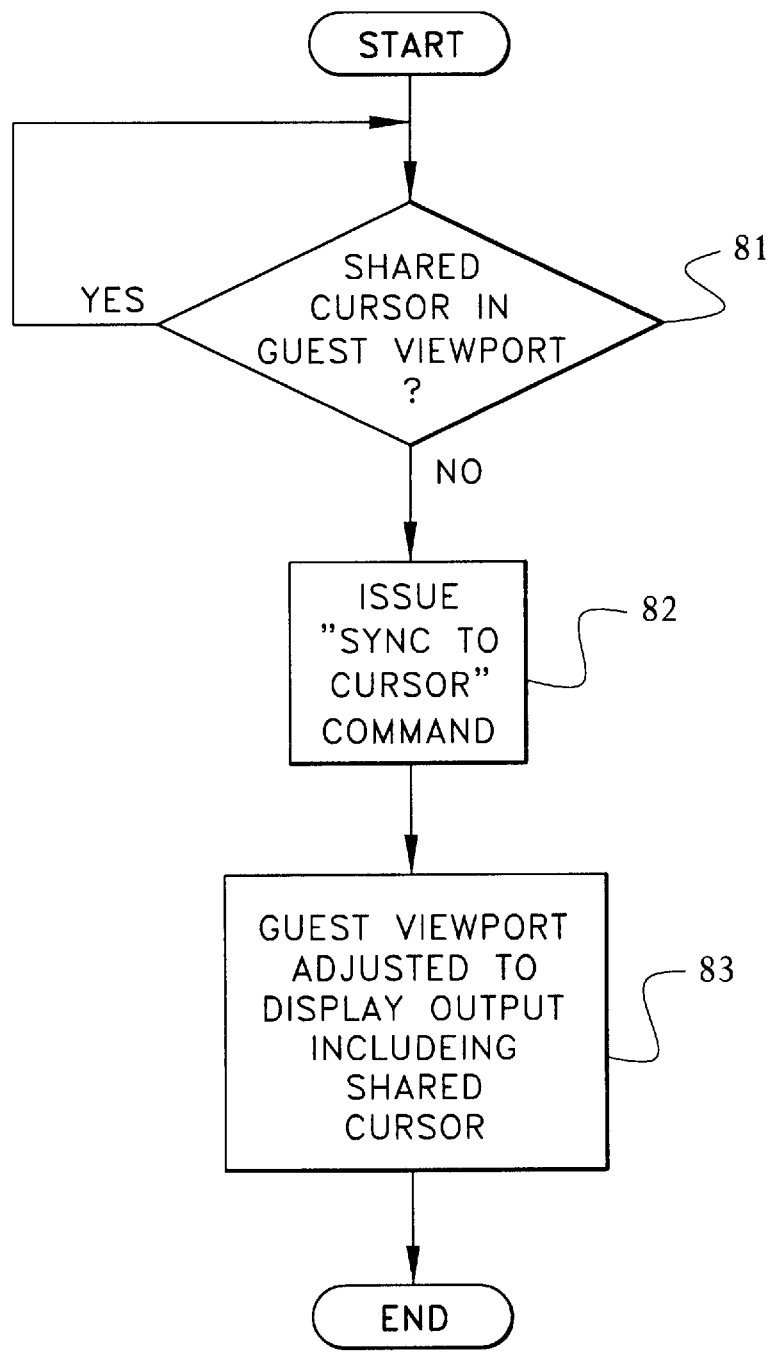
FIG. 8 is a flow chart showing synchronization of a guest output display according to the embodiment of the invention shown in FIGS. 7A and 7B.

Referring now to FIG. 8, ASGA 38 is provided with a module for automatically tracking guest shared cursor 72 within its associated viewport 43. According to the preferred embodiment, ASGA 38 tracks 81 guest shared cursor 72. In the event cursor 72 leaves or attempts to leave guest viewport 43, ASGA 38 issues command 82 to adjust 83 guest viewport 43 to encompass shared cursor 72 and the application output nearby the shared cursor relative to the position in host viewport 42 of host shared cursor 71, without regard to which application sharing participant is actively moving the shared cursor. For example, another guest or the host may be causing movement of guest shared cursor 72 and may move guest shared cursor 72 out of guest viewport 43. In this embodiment of the invention, guest viewport 43 automatically adjusts as shared cursor 72 is moved to maintain, for example, shared cursor 72 and surrounding application output somewhere within guest viewport 43.

In an embodiment, guest shared cursor 72 is adjusted to the center of or some other place within guest viewport 43 whenever it is moved to displayed output of application being shared 35 which is outside of guest viewport 43. In this embodiment, only occasional adjustments are necessary, whenever guest shared cursor 72 leaves the bounds of guest viewport 43.

The invention advantageously modifies the displayed output on one or more guest monitors of an application being shared so that the guest display and the host display are synchronized, i.e., display a similar area of output. Certain embodiments of the invention are described above but further embodiments will be understood by those skilled in the art having reference to the above description. For example, it is described above that upon execution of a SYNC TO POINT command generated in response to a REQUEST TO SYNC from a guest, all participating guests are "synced" to an area surrounding the point. In a further embodiment evident to persons of ordinary skill having reference to this description, only that guest which issues the REQUEST TO SYNC is "synced" to the point by the host. Furthermore, in yet another embodiment, the guests are able to issue SYNC TO POINT commands themselves, rather than relying on the host to issue these commands.

In an embodiment described above, a guest viewport automatically is adjusted to capture a shared cursor and application being shared output surrounding the shared cursor in the event the cursor is driven out of the guest viewport by the host or any guest. In another embodiment, all guest viewports can be adjusted whenever the shared cursor is driven from the viewport of any one guest. For example, the ASGA of any guest may issue "SYNC TO CURSOR" commands to all other guests to, for example, center the cursor in the viewports of the guests to actively and automatically maintain relative correspondence between the displayed output of the application being shared on the host and all of the guest monitors, when there are more than one guest.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. A computer implemented method for the sharing of one or more applications by a host and a first guest, the first guest having a guest viewport on a guest video monitor, the host having a host viewport on a host video monitor, the one or more applications generating an output display on the viewports of the host and the first guest, the method comprising the steps of:

(a) tracking, with the computer, the position of a shared cursor on the video monitor of the first guest; and
   (b) automatically adjusting with the computer, in accordance with said tracking, the output display of the viewport of the first guest as necessary to maintain a desired portion of the output display within the viewport of the first guest, wherein the automatic adjusting does not require input of a human user of the first guest.

2. The method of claim 1, wherein step (b) comprises the step of adjusting the output display of the viewport of the first guest to maintain the shared cursor within the viewport of the first guest.

3. The method of claim 1, wherein the shared cursor mimics movement of a host cursor in the host viewport and step (a) comprises the step of tracking the position of the shared cursor as it mimics the movement of the host cursor.

4. The method of claim 1, wherein a host cursor in the host viewport mimics movement of the shared cursor by the first guest and step (a) comprises the step of tracking the position of the shared cursor as it is being moved by the first guest.

5. The method of claim 1, wherein there is a second guest viewport having a second guest cursor and the shared cursor mimics movement of the second guest cursor, and step (a) comprises the step of tracking position of the shared cursor as it mimics the movement of the second guest cursor.

6. The method of claim 1, wherein a point is generated in the host viewport, the point being movable by the host within the output display on the host viewport, wherein step (b) comprises the step of adjusting the output display of the viewport of the first guest to include output display on the host viewport near the point.

7. The method of claim 6, wherein there are plural guest viewports, and step (b) comprises the step of adjusting the output display of the plural guest viewports to include output display on the host viewport near the point.

8. The method of claim 1, wherein there is a second guest viewport and a point is generated in the second guest viewport, the point being movable within the output display on the second guest viewport, and step (b) comprises the step of adjusting the output display on the first guest viewport to include output display near the point.

9. The method of claim 8, wherein step (b) comprises the step of adjusting the output display on the first guest viewport according to a command received from the host.

10. The method of claim 9, wherein the command is issued by the host in response to a request by the second guest for the host to issue the command.

11. The method of claim 1, wherein:
   step (a) comprises the step of tracking the position of the shared cursor within a pan window on the video monitor of the first guest, the pan widow representing the host viewport; and
   further comprising the step of generating a point in the pan window, the point being movable by the first guest to identify a section of the output display on the host viewport; and
   step (b) comprises the step of adjusting the output display of the viewport of the first guest to include the identified section.

12. The method of claim 11, wherein there are plural guest viewports and step (b) comprises the step of adjusting the output display of the plural guest viewports to include the identified section.

13. An apparatus for the sharing of one or more applications by a host and a first guest, the first guest having a guest viewport on a guest video monitor, the host having a host viewport on a host video monitor, the one or more applications generating an output display on the viewports of the host and the first guest, comprising:

(a) means for tracking, with a computer, the position of a shared cursor on the video monitor of the first guest; and
   (b) means for automatically adjusting with the computer, in accordance with said tracking, the output display of the viewport of the first guest as necessary to maintain a desired portion of the output display within the viewport of the first guest, wherein the automatic adjusting does not require input of a human user of the first guest.

14. The apparatus of claim 13, wherein means (b) adjusts the output display of the viewport of the first guest to maintain the shared cursor within the viewport of the first guest.

15. The apparatus of claim 13, wherein there is a second guest viewport and a point is generated in the second guest viewport, the point being movable within the output display on the second guest viewport, and means (b) adjusts the output display on the first guest viewport to include output display near the point.

16. The apparatus of claim 13, wherein:

means (a) tracks the position of the shared cursor within a pan window on the video monitor of the first guest, the pan widow representing the host viewport; and further comprising means for generating a point in the pan window, the point being movable by the first guest to identify a section of the output display on the host viewport; and means (b) adjusts the output display of the viewport of the first guest to include the identified section.

17. A storage medium encoded with machine-readable computer program code for the sharing of one or more applications by a host and a first guest, the first guest having a guest viewport on a guest video monitor, the host having a host viewport on a host video monitor, the one or more applications generating an output display on the viewports of the host and the first guest, comprising:

(a) means for causing a computer to track the position of a shared cursor on the video monitor of the first guest; and (b) means for causing the computer to automatically adjust, in accordance with said tracking, the output display of the viewport of the first guest as necessary to maintain a desired portion of the output display within the viewport of the first guest, wherein the automatic adjusting does not require input of a human user of the first guest.

18. The storage medium of claim 17, wherein means (b) causes the computer to adjust the output display of the first guest to maintain the shared cursor within the viewport of the first guest.

19. The storage medium of claim 17, wherein there is a second guest viewport and a point is generated in the second guest viewport, the point being movable within the output display on the second guest viewport, and means (b) causes the computer to adjust the output display on the first guest viewport to include output display near the point.

20. The storage medium of claim 17, wherein:

means (a) causes the computer to track the position of the shared cursor within a pan window on the video monitor of the first guest, the pan widow representing the host viewport; and further comprising means for causing the computer to generate a point in the pan window, the point being movable by the first guest to identify a section of the output display on the host viewport; and means (b) causes the computer to adjust the output display of the viewport of the first guest to include the identified section.

* * * * *